United States Patent
Amento et al.

(10) Patent No.: US 10,126,828 B2
(45) Date of Patent: *Nov. 13, 2018

(54) BIOACOUSTIC CONTROL SYSTEM, METHOD AND APPARATUS

(71) Applicant: AT&T Intellectual Property II, L.P., Atlanta, GA (US)

(72) Inventors: Brian Amento, Port Murray, NJ (US); William Colyer Hill, Montville, NJ (US); Loren Gilbert Terveen, Minneapolis, MN (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 34 days.

This patent is subject to a terminal disclaimer.

(21) Appl. No.: 15/250,375

(22) Filed: Aug. 29, 2016

(65) Prior Publication Data
US 2017/0052598 A1 Feb. 23, 2017

Related U.S. Application Data

(63) Continuation of application No. 11/586,142, filed on Oct. 25, 2006, now Pat. No. 9,430,043, which is a
(Continued)

(51) Int. Cl.
*G09G 5/08* (2006.01)
*G06F 3/01* (2006.01)
(Continued)

(52) U.S. Cl.
CPC .............. *G06F 3/017* (2013.01); *G06F 3/011* (2013.01); *G06F 3/0346* (2013.01); *H04B 1/385* (2013.01);
(Continued)

(58) Field of Classification Search
CPC ................................ G06F 3/017; G06F 3/0346
See application file for complete search history.

(56) References Cited

U.S. PATENT DOCUMENTS 3,629,521 A 12/1971 Puharich et al.
4,048,986 A 9/1977 Ott
(Continued)

FOREIGN PATENT DOCUMENTS

AU 2003257031 2/2004
AU 2007200415 8/2007
(Continued)

OTHER PUBLICATIONS

Fukumoto et al, Whisper: A Wristwatch Style Wearable Handset, CHI 99, pp. 112-119.*
(Continued)

*Primary Examiner* — Dorothy Harris
(74) *Attorney, Agent, or Firm* — Hartman & Citrin LLC

(57) ABSTRACT

Bioacoustic sensors and wireless technologies are used for the control of electronic devices, such as wireless telephones, pagers, music/media players or personal laptops and personal digital assistant (PDA) devices. Such control is implemented with certain systems, methods and apparatus which include bioacoustic sensors, a processor coupled to the bioacoustic sensors, and a transmitter coupled to the processor. The present invention is operative to detect particular hand and/or finger gestures, and to transmit control signals corresponding to the gestures for operative control of an electronic device.

12 Claims, 4 Drawing Sheets

Related U.S. Application Data continuation of application No. 09/898,108, filed on Jul. 3, 2001, now Pat. No. 7,148,879.

(60) Provisional application No. 60/265,212, filed on Jan. 31, 2001, provisional application No. 60/216,207, filed on Jul. 6, 2000.

(51) Int. Cl.
*H04B 1/3827* (2015.01)
*H04B 13/00* (2006.01)
*G06F 3/0346* (2013.01)

(52) U.S. Cl.
CPC ..... *H04B 13/00* (2013.01); *G06F 2203/0384* (2013.01); *H04B 13/005* (2013.01)

(56) References Cited

U.S. PATENT DOCUMENTS

| | | |
|---|---|---|
| 4,340,778 A | 7/1982 | Cowans et al. |
| 4,421,119 A | 12/1983 | Pratt |
| 4,720,607 A | 1/1988 | de Moncuit |
| 4,754,763 A | 7/1988 | Doemland |
| 4,799,498 A | 1/1989 | Collier |
| 4,988,981 A * | 1/1991 | Zimmerman .......... A61B 5/1114 345/156 |
| 5,024,239 A | 6/1991 | Rosenstein |
| 5,073,950 A | 12/1991 | Colbert et al. |
| 5,125,313 A * | 6/1992 | Hiyoshi .............. G10H 1/0558 84/600 |
| 5,319,747 A | 6/1994 | Gerrissen et al. |
| 5,327,506 A | 7/1994 | Stites, III |
| 5,368,044 A | 11/1994 | Cain et al. |
| 5,495,241 A | 2/1996 | Doing et al. |
| 5,615,681 A | 4/1997 | Ohtomo |
| 5,664,227 A | 9/1997 | Mauldin et al. |
| 5,720,290 A | 2/1998 | Buhler |
| 5,749,363 A | 5/1998 | Ishii |
| 5,766,208 A | 6/1998 | Mcewan |
| 5,810,731 A | 9/1998 | Sarvazyan et al. |
| 5,813,406 A * | 9/1998 | Kramer ............... A61B 5/6806 600/595 |
| 5,836,876 A | 11/1998 | Dimarogonas |
| 6,024,711 A | 2/2000 | Lentle |
| 6,115,482 A | 9/2000 | Sears et al. |
| 6,135,951 A | 10/2000 | Richardson et al. |
| 6,151,208 A * | 11/2000 | Bartlett ................ G06F 1/1626 361/679.03 |
| 6,154,199 A * | 11/2000 | Butler .................. G06F 3/014 345/158 |
| 6,213,934 B1 | 4/2001 | Bianco |
| 6,234,975 B1 | 5/2001 | Mcleod et al. |
| 6,244,873 B1 * | 6/2001 | Hill ..................... G06F 3/015 379/110.01 |
| 6,336,045 B1 | 1/2002 | Brooks |
| 6,380,923 B1 * | 4/2002 | Fukumoto ............ G06F 1/163 341/22 |
| 6,396,930 B1 | 5/2002 | Vaudrey et al. |
| 6,409,684 B1 | 6/2002 | Wilk |
| 6,507,662 B1 | 1/2003 | Brooks |
| 6,515,669 B1 * | 2/2003 | Mohri .................. G06F 3/014 345/418 |
| 6,580,356 B1 | 6/2003 | Alt et al. |
| 6,589,287 B2 | 7/2003 | Lundborg |
| 6,631,197 B1 | 10/2003 | Taenzer |
| 6,754,472 B1 | 6/2004 | Williams et al. |
| 6,783,501 B2 | 8/2004 | Takahashi et al. |
| 6,844,660 B2 | 1/2005 | Scott |
| 6,898,299 B1 | 5/2005 | Brooks |
| 6,912,287 B1 * | 6/2005 | Fukumoto ............ G06F 1/163 379/430 |
| 7,010,139 B1 | 3/2006 | Smeehuyzen |
| 7,123,752 B2 | 10/2006 | Kato et al. |
| 7,148,879 B2 | 12/2006 | Amento et al. |
| 7,198,607 B2 | 4/2007 | Jamsen |
| 7,206,423 B1 | 4/2007 | Feng et al. |
| 7,232,416 B2 | 6/2007 | Czernicki |
| 7,370,208 B2 | 5/2008 | Levin et al. |
| 7,405,725 B2 | 7/2008 | Mohri et al. |
| 7,536,557 B2 | 5/2009 | Murakami et al. |
| 7,539,533 B2 | 5/2009 | Tran |
| 7,615,018 B2 | 11/2009 | Nelson et al. |
| 7,625,315 B2 | 12/2009 | Hickman |
| 7,648,471 B2 | 1/2010 | Hobson |
| 7,671,351 B2 | 3/2010 | Setlak et al. |
| 7,708,697 B2 | 5/2010 | Wilkinson et al. |
| 7,760,918 B2 | 7/2010 | Bezvershenko et al. |
| 7,778,848 B1 | 8/2010 | Reeves |
| 7,796,771 B2 | 9/2010 | Calhoun et al. |
| 7,878,075 B2 | 2/2011 | Johansson et al. |
| 7,914,468 B2 | 3/2011 | Shalon et al. |
| 7,918,798 B2 | 4/2011 | Wu |
| 8,023,669 B2 | 9/2011 | Segev et al. |
| 8,023,676 B2 | 9/2011 | Abolfathi et al. |
| 8,031,046 B2 | 10/2011 | Franza et al. |
| 8,098,129 B2 | 1/2012 | Falck et al. |
| 8,196,470 B2 | 6/2012 | Gross et al. |
| 8,200,289 B2 | 6/2012 | Joo et al. |
| 8,253,693 B2 | 8/2012 | Buil et al. |
| 8,270,637 B2 | 9/2012 | Abolfathi |
| 8,270,638 B2 | 9/2012 | Abolfathi et al. |
| 8,312,660 B1 | 11/2012 | Fujisaki |
| 8,348,936 B2 | 1/2013 | Trembly et al. |
| 8,421,634 B2 | 4/2013 | Tan et al. |
| 8,467,742 B2 | 6/2013 | Hachisuka et al. |
| 8,482,488 B2 | 7/2013 | Jannard |
| 8,491,446 B2 | 7/2013 | Hinds et al. |
| 8,500,271 B2 | 8/2013 | Howell et al. |
| 8,521,239 B2 | 8/2013 | Hosoi et al. |
| 8,540,631 B2 | 9/2013 | Penner et al. |
| 8,542,095 B2 | 9/2013 | Kamei |
| 8,560,034 B1 | 10/2013 | Diab et al. |
| 8,594,568 B2 | 11/2013 | Falck |
| 8,750,852 B2 | 6/2014 | Forutanpour et al. |
| 8,922,427 B2 | 12/2014 | Dehnie et al. |
| 9,031,293 B2 | 5/2015 | Kalinli-Akbacak |
| 9,386,962 B2 | 7/2016 | Dahl |
| 9,430,043 B1 * | 8/2016 | Amento ................ G06F 3/017 |
| 2001/0013546 A1 | 8/2001 | Ross |
| 2001/0051776 A1 | 12/2001 | Lenhardt |
| 2003/0048915 A1 | 3/2003 | Bank |
| 2003/0066882 A1 | 4/2003 | Ross |
| 2003/0125017 A1 | 7/2003 | Greene et al. |
| 2003/0133008 A1 | 7/2003 | Stephenson |
| 2004/0152440 A1 | 8/2004 | Yoda et al. |
| 2005/0207599 A1 * | 9/2005 | Fukumoto ............. G06F 1/163 381/151 |
| 2005/0210269 A1 | 9/2005 | Tiberg |
| 2006/0018488 A1 | 1/2006 | Viala et al. |
| 2006/0132455 A1 | 6/2006 | Rimas-Ribikauskas |
| 2006/0149337 A1 | 7/2006 | John |
| 2007/0012507 A1 | 1/2007 | Lyon |
| 2007/0142874 A1 | 6/2007 | John |
| 2008/0064955 A1 | 3/2008 | Miyajima |
| 2008/0084859 A1 | 4/2008 | Sullivan |
| 2008/0223925 A1 | 9/2008 | Saito et al. |
| 2008/0260211 A1 | 10/2008 | Bennett et al. |
| 2009/0149722 A1 | 6/2009 | Abolfathi et al. |
| 2009/0228791 A1 | 9/2009 | Kim |
| 2009/0234262 A1 | 9/2009 | Reid, Jr. et al. |
| 2009/0287485 A1 | 11/2009 | Glebe |
| 2009/0289958 A1 | 11/2009 | Kim et al. |
| 2009/0304210 A1 | 12/2009 | Weisman |
| 2009/0309751 A1 | 12/2009 | Kano et al. |
| 2010/0016741 A1 | 1/2010 | Mix et al. |
| 2010/0066664 A1 | 3/2010 | Son et al. |
| 2010/0137107 A1 | 6/2010 | Jamsa et al. |
| 2010/0162177 A1 | 6/2010 | Eves et al. |
| 2010/0168572 A1 | 7/2010 | Sliwa et al. |
| 2010/0286571 A1 | 11/2010 | Allum et al. |
| 2010/0297944 A1 | 11/2010 | Lee |
| 2010/0315206 A1 | 12/2010 | Schenk et al. |
| 2010/0316235 A1 | 12/2010 | Park et al. |

(56) References Cited

U.S. PATENT DOCUMENTS

| | | |
|---|---|---|
| 2010/0328033 A1 | 12/2010 | Kamei |
| 2011/0022025 A1 | 1/2011 | Savoie et al. |
| 2011/0125063 A1 | 5/2011 | Shalon et al. |
| 2011/0134030 A1 | 6/2011 | Cho |
| 2011/0135106 A1 | 6/2011 | Yehuday et al. |
| 2011/0137649 A1 | 6/2011 | Rasmussen et al. |
| 2011/0152637 A1 | 6/2011 | Kateraas et al. |
| 2011/0155479 A1 | 6/2011 | Oda |
| 2011/0227856 A1 | 9/2011 | Corroy et al. |
| 2011/0245669 A1 | 10/2011 | Zhang |
| 2011/0255702 A1 | 10/2011 | Jensen |
| 2011/0260830 A1 | 10/2011 | Weising |
| 2011/0269601 A1 | 11/2011 | Nelson et al. |
| 2011/0276312 A1 | 11/2011 | Shalon et al. |
| 2011/0280239 A1 | 11/2011 | Tung et al. |
| 2011/0282662 A1 | 11/2011 | Aonuma et al. |
| 2012/0010478 A1 | 1/2012 | Kinnunen et al. |
| 2012/0011990 A1 | 1/2012 | Mann |
| 2012/0058859 A1 | 3/2012 | Elsom-Cook et al. |
| 2012/0065477 A1 | 3/2012 | Enomoto |
| 2012/0065506 A1 | 3/2012 | Smith |
| 2012/0143693 A1 | 6/2012 | Chung et al. |
| 2012/0202479 A1 | 8/2012 | Sugitani et al. |
| 2012/0212441 A1 | 8/2012 | Christiansson et al. |
| 2012/0280900 A1 | 11/2012 | Wang et al. |
| 2012/0290832 A1 | 11/2012 | Antequera Rodriguez et al. |
| 2013/0034238 A1 | 2/2013 | Abolfathi |
| 2013/0041235 A1 | 2/2013 | Rogers et al. |
| 2013/0097292 A1 | 4/2013 | Yoakum et al. |
| 2013/0119133 A1 | 5/2013 | Michael et al. |
| 2013/0120458 A1 | 5/2013 | Celebisoy et al. |
| 2013/0135223 A1 | 5/2013 | Shai |
| 2013/0142363 A1 | 6/2013 | Amento et al. |
| 2013/0170471 A1 | 7/2013 | Nix |
| 2013/0171599 A1 | 7/2013 | Bleich et al. |
| 2013/0173926 A1 | 7/2013 | Morese et al. |
| 2013/0212648 A1 | 8/2013 | Tietjen et al. |
| 2013/0215060 A1 | 8/2013 | Nakamura |
| 2013/0225915 A1 | 8/2013 | Redfield et al. |
| 2013/0225940 A1 | 8/2013 | Fujita et al. |
| 2013/0257804 A1 | 10/2013 | Vu et al. |
| 2013/0278396 A1 | 10/2013 | Kimmel |
| 2013/0288655 A1 | 10/2013 | Foruntanpour et al. |
| 2013/0346620 A1 | 12/2013 | Gizis et al. |
| 2014/0009262 A1 | 1/2014 | Robertson et al. |
| 2014/0028604 A1 | 1/2014 | Morinaga et al. |
| 2014/0035884 A1 | 2/2014 | Oh et al. |
| 2014/0097608 A1 | 4/2014 | Buzhardt et al. |
| 2014/0099991 A1 | 4/2014 | Cheng et al. |
| 2014/0107531 A1 | 4/2014 | Baldwin |
| 2014/0156854 A1 | 6/2014 | Gaetano, Jr. |
| 2014/0168093 A1 | 6/2014 | Lawrence |
| 2014/0168135 A1 | 6/2014 | Saukko et al. |
| 2014/0174174 A1 | 6/2014 | Uehara et al. |
| 2014/0188561 A1 | 7/2014 | Tenbrock et al. |
| 2014/0210791 A1 | 7/2014 | Hanauer et al. |
| 2014/0240124 A1 | 8/2014 | Bychkov |
| 2015/0084011 A1 | 3/2015 | Park et al. |
| 2015/0092962 A1 | 4/2015 | Amento et al. |
| 2015/0120465 A1 | 4/2015 | Baldwin et al. |
| 2015/0128094 A1 | 5/2015 | Baldwin et al. |
| 2015/0137936 A1 | 5/2015 | Baldwin et al. |
| 2015/0137960 A1 | 5/2015 | Baldwin et al. |
| 2015/0138062 A1 | 5/2015 | Baldwin et al. |
| 2015/0150116 A1 | 5/2015 | Baldwin et al. |
| 2015/0199950 A1 | 7/2015 | Heiman |
| 2016/0066834 A1 | 3/2016 | Baldwin et al. |
| 2016/0071382 A1 | 3/2016 | Baldwin et al. |
| 2016/0071383 A1 | 3/2016 | Baldwin et al. |
| 2016/0073296 A1 | 3/2016 | Baldwin et al. |
| 2016/0109951 A1 | 4/2016 | Baldwin et al. |

FOREIGN PATENT DOCUMENTS

| | | |
|---|---|---|
| CA | 1207883 | 7/1986 |
| EP | 0712114 | 5/1996 |
| EP | 0921753 | 6/1999 |
| EP | 1436804 | 2/2004 |
| EP | 2312997 | 4/2011 |
| EP | 2643981 | 5/2012 |
| EP | 2483677 | 8/2012 |
| GB | 2226931 | 7/1990 |
| GB | 2348086 | 9/2000 |
| JP | 02249017 | 10/1990 |
| JP | 04-317638 A | 11/1992 |
| JP | 2003058190 | 2/2003 |
| JP | 2005142729 | 6/2005 |
| JP | 2010210730 | 9/2010 |
| KR | 20100056688 | 10/1990 |
| TW | 200946887 | 8/1997 |
| WO | WO 8201329 | 4/1982 |
| WO | WO 96/01585 | 1/1996 |
| WO | WO 2003033882 | 4/2003 |
| WO | WO 2006094372 | 9/2006 |
| WO | WO 2009001881 | 12/2008 |
| WO | WO 2010045158 | 4/2010 |
| WO | WO 2012168534 | 12/2012 |

OTHER PUBLICATIONS

Fukumoto et al, Body Coupled FingeRing Wireless Wearable Keyboard, CHI 97, Mar. 1997, pp. 147-154.*

Matsushita et al, Wearable Key Device for Personalizing nearby Environment, Proceedings of the Fourth International Symposium on Wearable Computers (ISWC'00), Feb. 2000, pp. 1-8.*

U.S. Office Action dated Mar. 8, 2010 in U.S. Appl. No. 11/586,142.

U.S. Office Action dated Aug. 12, 2010 in U.S. Appl. No. 11/586,142.

Examiner's Answer to Appeal Brief dated Apr. 22, 2011 in U.S. Appl. No. 11/586,142.

Patent Board Decision dated Sep. 25, 2014 in U.S. Appl. No. 11/586,142.

U.S. Notice of Allowance dated Dec. 18, 2014 in U.S. Appl. No. 11/586,142.

U.S. Office Action dated Aug. 25, 2015 in U.S. Appl. No. 11/586,142.

U.S. Office Action dated Feb. 13, 2013 in U.S. Appl. No. 13/309,124.

U.S. Office Action dated Sep. 24, 2013 in U.S. Appl. No. 13/309,124.

U.S. Office Action dated Jan. 29, 2014 in U.S. Appl. No. 13/309,124.

U.S. Office Action dated Dec. 17, 2015 in U.S. Appl. No. 14/065,663.

U.S. Office Action dated Feb. 25, 2016 in U.S. Appl. No. 14/072,126.

U.S. Office Action dated Aug. 25, 2015 in U.S. Appl. No. 14/083,094.

U.S. Office Action dated Jun. 25, 2015 in U.S. Appl. No. 14/083,110.

U.S. Office Action dated Nov. 19, 2015 in U.S. Appl. No. 14/083,499.

U.S. Notice of Allowance dated Apr. 4, 2016 in U.S. Appl. No. 14/083,499.

U.S. Office Action dated Nov. 19, 2015 in U.S. Appl. No. 14/090,668.

U.S. Notice of Allowance dated Mar. 21, 2016 in U.S. Appl. No. 14/090,668.

U.S. Office Action dated Mar. 16, 2016 in U.S. Appl. No. 14/482,087.

U.S. Office Action dated Mar. 10, 2016 in U.S. Appl. No. 14/482,091.

U.S. Office Action dated Jul. 12, 2016 in U.S. Appl. No. 14/482,091.

U.S. Office Action dated Jan. 11, 2016 in U.S. Appl. No. 14/514,658.

Zhong et al., "OsteoConduct: Wireless Body-Area Communication based on Bone Conduction," Proceeding of the ICST 2nd International Conference on Body Area Networks, BodyNets 2007.

Travis et al., "Hambone: A bio-acoustic gesture interface," 2007 11th IEEE International Symposium on Wearable Computers, 2007.

Scanlon, Michael V. Acoustic sensor for health status monitoring. Army Research Lab Aberdeen Proving Ground MD, 1998.

Yamada, Guillaume Lopez; Masaki Shuzo; Ichiro. "New healthcare society supported by wearable sensors and information mapping-based services." International Journal of Networking and Virtual Organisations 9.3 (2011): 233-247.

Scanlon, Michael V. "Acoustic sensors in the helmet detect voice and physiology." AeroSense 2003. International Society for Optics and Photonics, 2003.

(56) References Cited

OTHER PUBLICATIONS

Amento et al., "The Sound of One Hand: A Wrist-Mounted Bio-Acoustic Fingertip Gesture Interface," Short Talk: It's All About Sound, CHI 2002.
"Kinect Gestures," retrieved from http://support.xbox.com/en-US/xbox-360/kinect/body-controller on Oct. 24, 2013.
Mark Billinghurst, "Chapter 14: Gesture Based Interaction," Haptic Input, Aug. 24, 2011.
Kompis, Martin, and Rudolf Haeusler, "Electromagnetic interference of bone-anchored hearing aids by cellular phones revisited," Acta oto-laryngologica 122.5, 2002, 510-512.
Chris Harrison, Desney Tan, Dan Morris, "Skinput: Appropriating the Skin as an Interactive Canvas," CommuniCations of the ACM 54.8, 2011, 111-118.
T. Scott Saponas, et al., "Enabling always-available input with muscle-computer interfaces," Proceedings of the 22nd Annual ACM Symposium on User Interface Software and Technology, ACM, 2009.
Jao Henrique Donker, "The Body as a communication medium," 2009.
Sang-Yoon Chang, et al., "Body Area Network Security: Robust Key Establishment Using Human Body Channel," retrieved from https://www.usenix.org/system/files/conference/healthsec12/healthsec12-final15.pdf on Oct. 16, 2013.
Vidya Bharrgavi, et al., "Security Solution for Data Integrity in Wireless BioSensor Networks," Distributed Computing Systems Workshops, 2007, ICDCSW'07, 27th International Conference, IEEE, 2007.
Daniel Halperin, et al., "Pacemakers and Implantable Cardiac Defibrillators: Software Radio Attacks and Zero-Power Defenses," Security and Privacy, SP 2008, IEEE Symposium, IEEE, 2008.
Carmen C. Y. Poon, et al., "A Novel Biometrics Method to Secure Wireless Body Area Sensor Networks for Telemedicine and M-Health," Communications Magazine, IEEE 44.4, 2006, 73-81.
Zicheng Liu, et al., "Direct Filtering for Air-and Bone-Conductive Microphones," Multimedia Signal Processing, 2004 IEEE 6th Workshop, IEEE, 2004.
Mujibiya, Adiyan, et al. "The sound of touch: on-body touch and gesture sensing based on transdermal ultrasound propagation." Proceedings of the 2013 ACM international conference on Interactive tabletops and surfaces. ACM, 2013.
Harrison, Chris, Robert Xiao, and Scott Hudson. "Acoustic barcodes: passive, durable and inexpensive notched identification tags." Proceedings of the 25th annual ACM symposium on User interface software and technology. ACM, 2012.
Yoo, Jerald, Namjun Cho, and Hoi-Jun Yoo. "Analysis of body sensor network using human body as the channel." Proceedings of the ICST 3rd international conference on Body area networks. ICST (Institute for Computer Sciences, Social-Informatics and Telecommunications Engineering), 2008.
Ni, Tao, and Patrick Baudisch. "Disappearing mobile devices." Proceedings of the 22nd annual ACM symposium on User interface software and technology. ACM, 2009.
"Hinckley, Ken, and Hyunyoung Song, Sensor synaesthesia: touch in motion, and motion in touch." Proceedings of the SIGCHI Conference on Human Factors in Computing Systems. ACM, 2011.
Hinge, Dhanashree, and S. D. Sawarkar. "Mobile to Mobile data transfer through Human Area Network." IJRCCT 2.11 (2013): 1181-1184.
Park, Duck Gun, et al. "TAP: touch-and-play." Proceedings of the SIGCHI conference on Human Factors in computing systems. ACM, 2006.
Ruiz, J. Agud, and Shigeru Shimamoto. "A study on the transmission characteristics of the human body towards broadband intra-body communications." Consumer Electronics, 2005.(ISCE 2005). Proceedings of the Ninth International Symposium on. IEEE, 2005.
Nagai, Ryoji, et al. "Near-Field Coupling Communication Technology for Human-Area Networking." Proc. Conf. on Information and Communication Technologies and Applications (ICTA2011), International Institute of Informatics and Systems (IIIS). 2012.
Lipkova, Jolana, and Jaroslav Cechak. "Transmission of Information Using the Human Body," http://www.iiis.org/cds2010/cd2010imc/ccct_2010/paperspdf/ta303gi.pdf, CCCT 2010.
Maruf, Md Hasan. "An Input Amplifier for Body-Channel Communication." (2013).
Rekimoto, Jun. "Gesturewrist and gesturepad: Unobtrusive wearable interaction devices." Wearable Computers, 2001. Proceedings. Fifth International Symposium on. IEEE, 2001.
U.S. Office Action dated Oct. 20, 2016 in U.S. Appl. No. 14/482,078.
U.S. Office Action dated Sep. 14, 2016 in U.S. Appl. No. 14/482,101.
U.S. Notice of Allowance dated Oct. 7, 2016 in U.S. Appl. No. 15/224,808.
U.S. Office Action dated Apr. 7, 2017 in U.S. Appl. No. 14/065,663.
U.S. Office Action dated Jun. 1, 2017 in U.S. Appl. No. 14/482,078.
U.S. Office Action dated May 10, 2017 in U.S. Appl. No. 15/161,499.
U.S. Notice of Allowance dated Mar. 28, 2017 in U.S. Appl. No. 15/224,808.
U.S. Office Action dated Apr. 21, 2017 in U.S. Appl. No. 15/450,624.
Nakanishi et al. "Biometric Identity Verification Using Intra-Body Propagation Signal." 2007 Biometrics Symposium. IEEE, 2007.
Hachisuka et al. "Development and Performance Analysis of an Intra-Body Communication Device." The 12th International Conference on Solid State Sensors, Actuators and Microsystems, Boston, Jun. 8-12, 2003. IEEE, 2003.
Notice of Allowance dated Aug. 21, 2017 in U.S. Appl. No. 14/065,663.
Notice of Allowance dated Aug. 22, 2017 in U.S. Appl. No. 15/450,624.
Office Action dated Dec. 14, 2016 in U.S. Appl. No. 14/561,549.
U.S. Notice of Allowance dated Nov. 17, 2017 in U.S. Appl. No. 14/482,101.
U.S. Office Action dated Jul. 7, 2016 in U.S. Appl. No. 14/072,126.
U.S. Office Action dated Mar. 22, 2018 in U.S. Appl. No. 15/450,624.

* cited by examiner

BIOACOUSTIC CONTROL SYSTEM, METHOD AND APPARATUS

CROSS-REFERENCE TO RELATED APPLICATIONS

This application is a continuation of and claims priority to U.S. patent application Ser. No. 11/586,142, filed Oct. 25, 2006, now U.S. Pat. No. 9,430,043 which is a continuation of U.S. patent application Ser. No. 09/898,108, filed Jul. 3, 2001, now U.S. Pat. No. 7,148,879, which claims priority to U.S. Provisional Application No. 60/265,212, filed Jan. 31, 2001, and to U.S. Provisional Application No. 60/216,207, filed Jul. 6, 2000, all of which are incorporated herein by reference in their entireties.

BACKGROUND OF THE INVENTION

The present invention relates to the field of user interfaces for portable electronic devices, and more particularly to a system, method and apparatus for sensing and interpreting finger gestures and movements to control and provide input to electronic devices.

Portable electronic devices have become increasingly popular. Examples of these devices include wireless or cellular telephones, personal digital assistants (PDAs), pagers and audio or music delivery devices. Some devices have become increasingly small such that they are now deemed "pocketable" and/or "wearable."

A portable electronic device typically has a user interface for operative control. Most if not all conventional user interfaces for such portable electronic devices employ physical buttons, stylus, or voice control. In some devices, a large number of operations or functions are possible with the user interface.

One major shortcoming of these prior art user interfaces is that the user must physically retrieve and position the portable electronic device appropriately for physical contact therewith, for example, by utilizing a stylus to provide commands upon a touch sensitive screen of a PDA or by manually depressing function buttons on a portable media player. In addition, as the size of a device becomes smaller, the interface becomes increasingly inappropriate from an ergonomic standpoint. Voice controlled systems may alleviate some of these problems, however, the major shortcoming of a voice-controlled interface is that the user must speak openly in such a way that other nearby people may hear. Many voice controlled systems are also extremely sensitive to environmental noise and interference.

Accordingly, it would be desirable to have a system, method and apparatus for improving the shortcomings of prior art electronic device control systems.

SUMMARY OF THE INVENTION

The present invention is a system, method and apparatus for controlling and providing data, signals and commands to electronic devices such as wireless phones, Personal Digital Assistants (PDAs), music players/recorders, media players/recorders, computers such as laptops or other portable computers, public telephones and other devices. As described herein, the inventive systems, methods and apparatus involve the use of bioacoustic or contact sensing technology, adaptive training methods and wireless technology for the control of such electronic devices.

In one embodiment, the present invention is a method for controlling an electronic device which includes receiving one or more bioacoustic signals, each signal related to one or more hand gestures, determining the identity of the one or more hand gestures based on a positive correlation between the received signals and predetermined hand gesture data and selectively issuing one or more commands associated with the identified hand gesture for activating one or more functions of the electronic device.

In another embodiment, the present invention is a wrist adaptable wireless apparatus for invoking functions of a portable wireless device including a processor coupled to at least one piezo-electric contact microphone which receives sensor signal data, a storage facility for storing a plurality of gesture patterns wherein the processor is operative to compare sensor signal data with the plurality of gesture patterns, to detect a substantial match between the sensor signal data and one of the plurality of gesture patterns, and to select one of a plurality of user input commands associated with the match, wherein the plurality of user input commands correspond to a plurality of functions of the portable wireless device; and a wireless transmitter coupled to said processor and operative to wirelessly transmit the user input command to the portable wireless device.

In yet another embodiment, the present invention is a wireless control system including a bioacoustic sensor component, a digital processor coupled to the sensor component, a storage component for storing gesture pattern data indicative of a plurality of gestures, each gesture corresponding to a unique one of a plurality of electronic device commands wherein the processor is operative to compare acoustic sensor signals with the gesture pattern data and to select one of the electronic device commands corresponding to a gesture that correlates with the acoustic sensor signals and a wireless transmitter and antenna coupled to the processor and operative to transmit the electronic device command.

DETAILED DESCRIPTION

Figure 1:
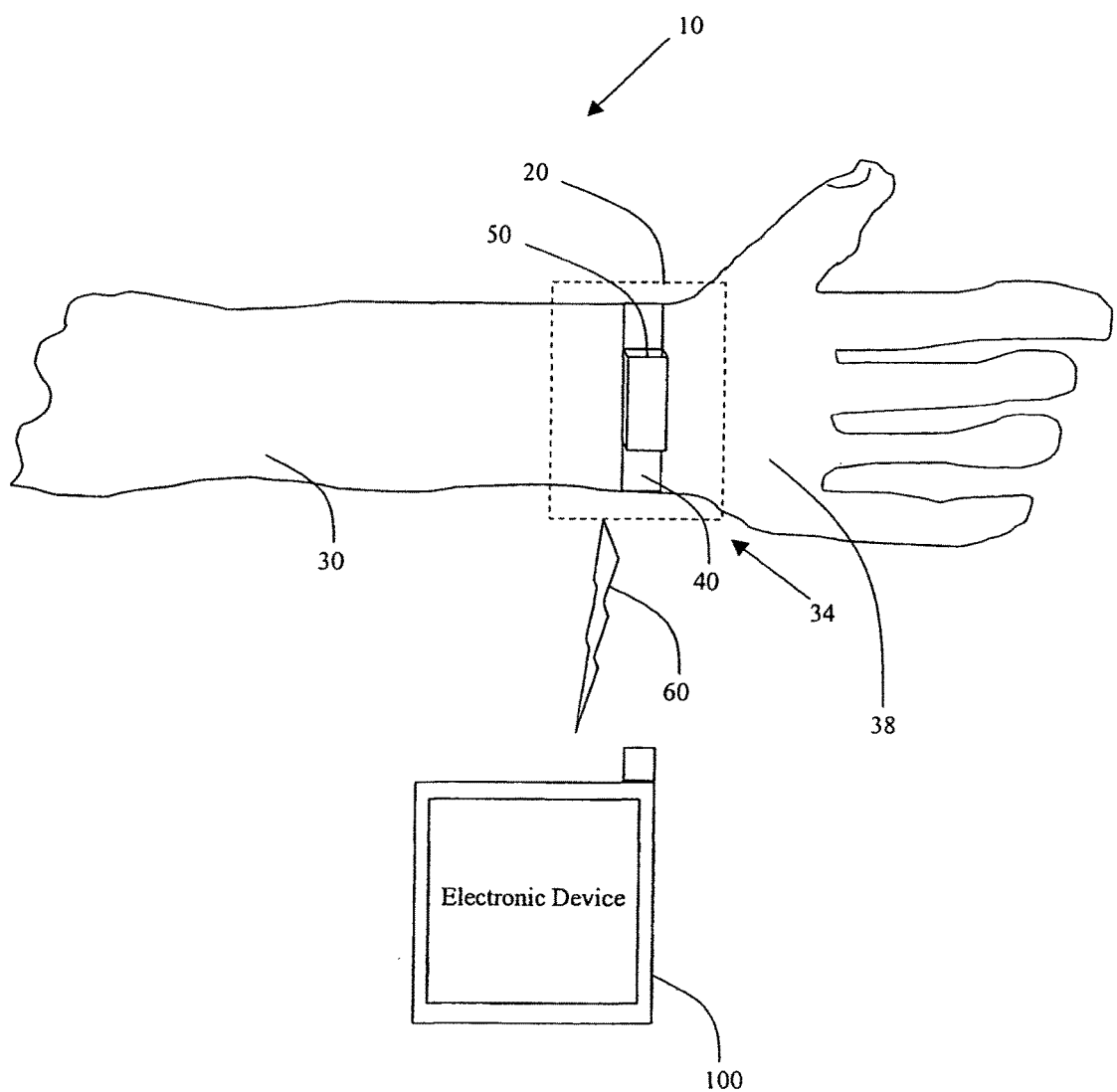
FIG. 1 illustrates an exemplary system of the present invention.

Referring to FIG. 1, one embodiment of a system 10 for controlling electronic devices is shown. In this embodiment, system 10 includes a wireless bioacoustic apparatus 20 which is in communication with an electronic device 100. As used herein, the term "electronic device" may include laptops, mobile phones, personal digital assistants (PDAs), handhelds, PCs, pagers, music players/recorders, media players/recorders and other electronic devices. For example, the present invention may be used to activate certain play functions such as stop, pause, play, rewind and record on a media player/recorder device without having the user manually activate the device in a conventional fashion. In the present invention, bioacoustic apparatus 20 is operative to communicate with electronic device 100 via the air signals 60, such as radio frequency (RF) signals, infrared signals, microwave signals or other suitable over-the-air signals using a variety of wireless standards and protocols like IEEE 802.11, Bluetooth, etc. or other similar methodologies, like via a capacitive body network. Accordingly, it is contemplated that electronic device 100 will have a facility for receiving and processing such signals in order to translate the signals into the corresponding device commands or sequences. Such a facility, in one exemplary embodiment, may be an RF receiver and processor for receiving RF signals and effectuating the commands corresponding to the signals on the electronic device.

In one embodiment, apparatus 20 includes a band 40 having bioacoustic sensor material formed therein or attached thereto. Band 40 has a signal processing component 50 attached thereto which may include components such as a signal amplifier, a digital processor, a memory, a broadcast component, an encryption module and an antenna, as discussed in more detail later herein. Bioacoustic sensor material may be one or more piezo-electric contact materials or films (also referred to herein as microphones). Preferably, band 40 is sized and configured to fit around a human arm 30. More preferably, band 40 is sized and configured to fit around a distal end 34 of human arm 30, proximate to a human hand 38. In one embodiment, the material of band 40 may be constructed of fabric, elastic, links, or other structure capable of incorporating bioacoustic sensor material, such as bioacoustic material incorporating one or more piezo-electric contact microphones therein. In a preferred embodiment, band 40 has an outer surface and an inner surface, wherein signal processing component 50 is attached or affixed to the band's outer surface and the bioacoustic sensor material is formed or attached to an inner surface of band 40. In this configuration, the bioacoustic material is positioned to receive bioacoustic signals from the user. In the present invention, the bioacoustic or piezo-electric material is optimized for sensing vibration in human skin over the ulna bone at the wrist. The internal sound is conducted by the bones of the hand and wrist to the ulna below the wristband sensor. Airborne sound does not register in the wristband.

As discussed in more detail later herein, signal processing component 50 may be configured in a wristwatch or wristwatch like configuration and incorporate one or more of a signal amplifier, digital processor, broadcast facility, memory and other components which are operative to receive, process and provide bioacoustic signals.

Figure 2:
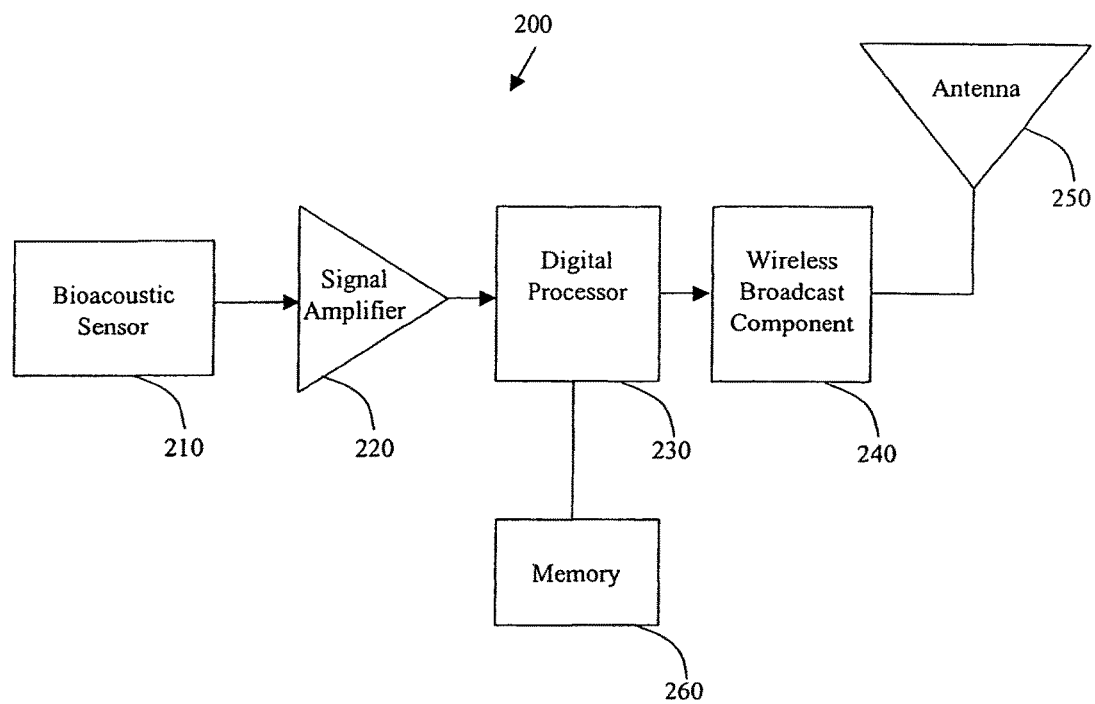
FIG. 2 illustrates an exemplary system configuration of the present invention.

Referring to FIG. 2, an exemplary apparatus configuration 200 is shown. In this embodiment, configuration 200 includes a bioacoustic sensor 210, a signal amplifier 220, a digital processor 230, and a wireless broadcast component 240, such as a small-field or narrowcast broadcast device which is coupled to an antenna 250. In one embodiment, signal amplifier 220, digital processor 230, wireless broadcast component 240 and antenna 250 are embedded or integrated in a wrist mount or wristwatch-like configuration, such as shown in FIG. 1 with respect to signal processing component 50. Configuration 200 may also include a memory 260 which is coupled to digital processor 230. A power source, such as a battery, not shown, may also be integrated within apparatus configuration 200. In another embodiment, apparatus configuration 200 may include an audio feedback mechanism, not shown, for emitting audio feedback to the user when a user gesture is sensed. In yet another embodiment, apparatus configuration may include an auxiliary information component, not shown, which can receive and display small amounts of information such as sports scores, stock quotes, weather and appointments received from third party providers. In a further embodiment, apparatus configuration 200 may include an encryption module for encrypting signals, for example, that are transmitted via wireless broadcast component 240. In one embodiment, these signals are narrowcasted from the apparatus which encrypts the signals via an encryption module and then broadcasts commands to an electronic device such as a wireless phones, handheld computers or any nearby devices equipped with appropriate receiver and decrypting facilities for decrypting the encrypted signals.

In the present invention it is contemplated that one or more of the various apparatus components or elements, such as digital processor 230, wireless broadcast device 240, antenna 250, memory 260 and other components such an encryption module may be remotely located from bioacoustic sensor 210. For example, such components or elements may be integrated into a container which is placed in a region other than the user's arm, such as in a belt configuration or other remote configuration.

In another embodiment, the present invention may be configured with one or more piezo-electric contact microphones, signal amplifier, digital processor, a small-field wireless broadcast device and antenna embedded in a finger ring plus a wristwatch amplifier/repeater, not shown. In this embodiment, the wristwatch contains a larger battery than the ring and rebroadcasts gesture commands to the user's wearable devices once received from the ring. The wristwatch can also receive and display small amounts of information such as sports scores, stock quotes, weather and appointments.

In such an embodiment, sensing is performed at the finger ring of the bone-conducted sound of index and middle finger contacts with the thumb. Once sensed, these signals are narrowcasted from the sensing ring to the wristwatch which encrypts and broadcasts commands to worn cell phones, handheld computers or any nearby digital devices equipped with an appropriate receiver. However, in such an embodiment, the broadcast signals can only be decrypted by authorized digital devices.

In yet another embodiment of the invention, a fingernail (or thumbnail) mounted, or ring-mounted touch-edge and touch-surface device that emits coded audio tones into the finger (or thumb) to be picked up by a wrist unit controller and relayed forward to the controlled wearable device is used. In still another embodiment, a narrow-casting infra-red remote control embedded in a watch configuration for control of devices in any environment is used. In another embodiment, coded audio is emitted out from the wrist through the hand to grasped objects such as door knobs for unlocking and locking doors. In still another embodiment, coded audio is received from objects grasped by the hand, and the audio signals are relayed from the wrist to the wearable device.

Figure 3:
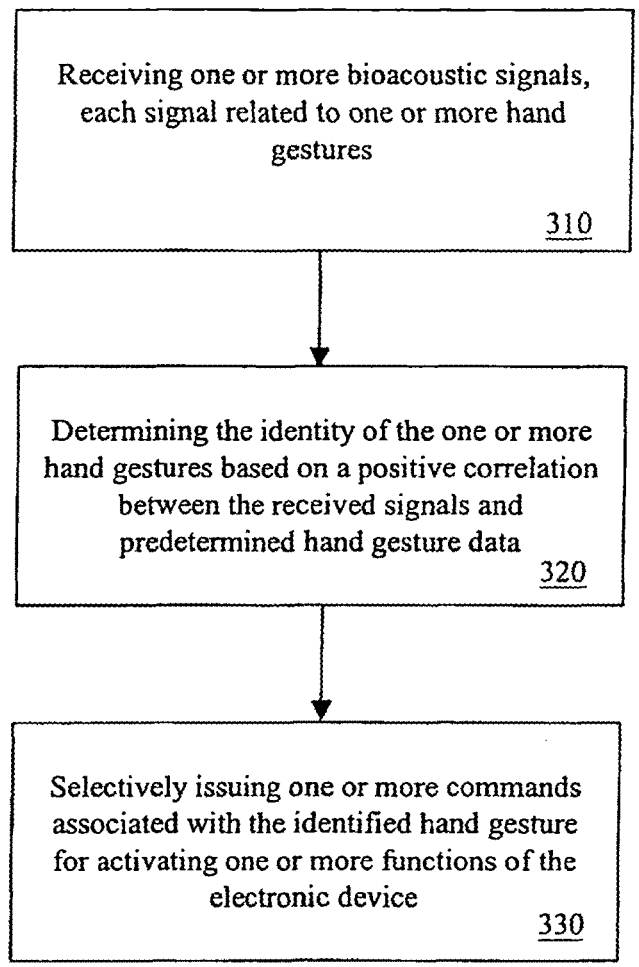
FIG. 3 illustrates an exemplary method of the present invention.

Referring to FIG. 3, an exemplary method of the present invention is shown. In this embodiment, the system receives one or more bioacoustic signals from the user wherein each signal is related to one or more hand gestures, step 310. Once the bioacoustic signals are received, the identity of the one or more hand related gestures is determined based on a positive correlation between the received signals and predetermined hand gesture data, step 320. Once a gesture is identified, one or more commands associated with the identified hand related gesture are issued which activate a corresponding function of an electronic device, such as the user's PDA, laptop, music player, media player, wireless phone, laptop or other similar device.

The invention includes a user-specific training module for machine learning of gesture classification of the finger gesture audio patterns. During the device training session, users are asked by the system to perform hand gestures repeatedly such as "touch index finger to thumb", "touch middle finger to thumb", or "snap your fingers". At the same time the learning component accurately learns the mapping from signal to gesture for the given individual user. Training and adaptation for gesture classification may be performed using a discriminative algorithm. The learning algorithm first maps the high dimensional recordings into an internal compact representation. It then uses a machine learning technique called boosting to find a set of discriminative features. Finally, these features are combined into a single highly accurate yet compact gesture classifier. For example, in one embodiment, a state machine or hidden Markov model (HMM) may be used to classify quantized voltages into gesture classes to control the desired devices.

The present invention is designed to listen for or otherwise sense (via wrist, forearm, fingernail or ring-mounted sensors) naturally occurring fingertip or hand gestures. Exemplary detectable gestures include:
   Thumb as anvil—index or middle finger as hammer
   Neither ring finger nor pinky used
   Thumbpad to fingerpad
   Thumbpad to fingernail edge
   Fingerpad to thumbnail top
   Small gestures: maximum displacement of 5 cm.
   Gentle gestures: <10% of pressing strength.
   Fingertip tap, double tap
   Fingerpad and thumbpad rub
   "Money gesture" (rubbing fingers together)
   Fingerpad and thumbpad press
   Soft flick (fingernail edge outward across thumbpad)
   Thumbpad against fingernail edge (back and forth, tap)
   Fingerpad on thumbnail edge (back and forth, tap)
   Fingerpad on thumbnail surface (2D movement)

In one exemplary embodiment, a finger/thumb tap means select, a finger/thumb double-tap means operate, a money gesture (rub) means scroll. In the present invention sound made by fingertip gestures, worn rings or fingernail-mounted devices, or grasped objects such as doorknobs, light-switches or wall-mounted name-plates may also be sensed by the bioacoustic sensors or microphones.

In another exemplary embodiment, a user wearing a wireless phone and earpiece or headset might listen to voicemails or music using VCR-like "forward", "play", "stop", and "rewind" commands mapped to the tapping of thumb to index finger for "play", thumb to middle finger for "stop", thumb sliding from middle finger to index finger for "forward" and thumb sliding from index finger to middle finger for "rewind". In a public area, the user can make these gestures silently and in a visually concealed and private manner without unholstering any controlled digital device.

Figure 4:
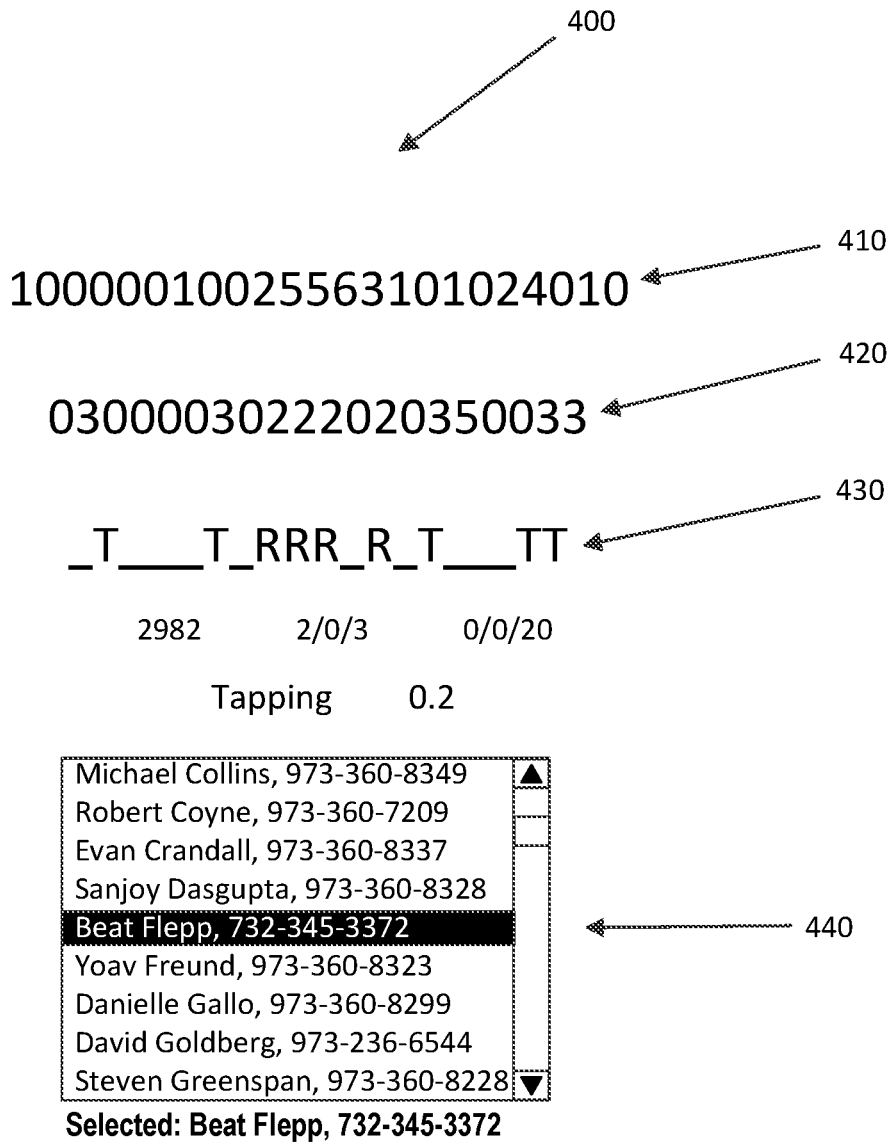
FIG. 4 is an exemplary training scenario screen of the present invention.

Referring to FIG. 4, an exemplary screen display 400 implementing an exemplary gesture classifier of the present invention is shown. In this embodiment of the gesture classifier, the classifier is shown in the process of receiving certain bioacoustic signatures of a specific fingertip gesture. Within screen display 400, a top line 410 shows quantized signals every 10th of one second 8000 samples per second. A second line 420 within screen display 400 provides the state of the state-machine classifier algorithm. A third line 430 shows the output classification either R for a rub of the thumbpad against the fingertips or T for a tapping of the thumb and index or ring finger.

One or more readout panels may also be provided as shown in FIG. 4. Panel 440 is a cellular phonebook application controlled with fingertip gestures. The application has names of contacts and their respective phone numbers. In this embodiment, for example, rubbing one's fingertips scrolls the application while tapping selects the highlighted name and number for dialing. Of course, other variations and options for controlling the application may be set as desired by the user or as required by the application.

One of the many advantages of the present invention is that users can control digital devices near them without speech or physically manipulating their respective devices. Users control nearby digital devices merely through the use of simple finger gestures with concurrent audio signals sensed, learned, interpreted, encrypted and broadcast to the devices. Furthermore, while the present system, method and apparatus are ideally suited to provide able-bodied users with more convenient, intuitive and efficient ways to control electronic devices, the system, method and apparatus of the present invention would also greatly benefit people with special needs, such as people with severe speech articulation problems or other similar ailments or handicaps which make conventional user interface controls difficult or even impossible to use. It is contemplated that a wearable communication device of the present invention could make a big difference in the quality of life of such people.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A method comprising:
   receiving, by a wearable apparatus comprising a bioacoustic sensor and a processor, a bioacoustic signal via the bioacoustic sensor, the bioacoustic signal related to a particular hand gesture, the particular hand gesture associated with a particular command, the particular command associated with activation of a particular function performed by an electronic device, wherein the bioacoustic signal is conducted by way of at least one bone to the wearable apparatus;
   identifying, by the wearable apparatus, the particular hand gesture related to the bioacoustic signal based on a positive correlation between the bioacoustic signal and predetermined hand gesture data;
   selecting, by the wearable apparatus, the particular command associated with the particular hand gesture related to the bioacoustic signal; and
   wirelessly transmitting, by the wearable apparatus, the particular command associated with the particular hand gesture to the electronic device to activate performance of the particular function by the electronic device.

2. The method of claim 1, further comprising encrypting, by the wearable apparatus, the particular command associated with the particular hand gesture prior to wirelessly transmitting the particular command to the electronic device.

3. The method of claim 1, further comprising providing feedback associated with the particular hand gesture.

4. The method of claim 1, wherein the at least one bone comprises at least one bone of a hand.

5. A wearable apparatus comprising:
   a bioacoustic sensor;
   a processor; and
   a memory that stores instructions that, when executed by the processor, cause the processor to perform operations comprising
      receiving, via the bioacoustic sensor, a bioacoustic signal, the bioacoustic signal related to a particular hand gesture, the particular hand gesture associated with a particular command, the particular command associated with activation of a particular function performed by an electronic device, wherein the bioacoustic signal is conducted by way of at least one bone to the wearable apparatus, identifying the particular hand gesture related to the bioacoustic signal based on a positive correlation between the bioacoustic signal and predetermined hand gesture data, selecting the particular command associated with the particular hand gesture related to the bioacoustic signal, and wirelessly transmitting the particular command associated with the particular hand gesture to the electronic device to activate performance of the particular function by the electronic device.

6. The wearable apparatus of claim 5, wherein the operations further comprise encrypting the particular command associated with the particular hand gesture prior to wirelessly transmitting the particular command to the electronic device.

7. The wearable apparatus of claim 5, wherein the operations further comprise providing feedback associated with the particular hand gesture.

8. The wearable apparatus of claim 5, wherein the at least one bone comprises at least one bone of a hand.

9. A non-transitory storage component that stores instructions that, when executed by a processor of a wearable apparatus comprising a bioacoustic sensor, cause the processor to perform operations comprising:

receiving, via the bioacoustic sensor, a bioacoustic signal, the bioacoustic signal related to a particular hand gesture, the particular hand gesture associated with a particular command, the particular command associated with activation of a particular function performed by an electronic device, wherein the bioacoustic signal is conducted by way of at least one bone to the wearable apparatus;

identifying the particular hand gesture related to the bioacoustic signal based on a positive correlation between the bioacoustic signal and predetermined hand gesture data;

selecting the particular command associated with the particular hand gesture related to the bioacoustic signal; and wirelessly transmitting the particular command associated with the particular hand gesture to the electronic device to activate performance of the particular function by the electronic device.

10. The non-transitory storage component of claim 9, wherein the operations further comprise encrypting the particular command associated with the particular hand gesture prior to wirelessly transmitting the particular command to the electronic device.

11. The non-transitory storage component of claim 9, wherein the operations further comprise providing feedback associated with the particular hand gesture.

12. The non-transitory storage component of claim 9, wherein the at least one bone comprises at least one bone of a hand.

* * * * *